US012764077B2

(12) United States Patent
Teshima et al.

(10) Patent No.: US 12,764,077 B2
(45) Date of Patent: Oct. 13, 2026

(54) BUS COMMUNICATION DEVICE AND DATA COMMUNICATION METHOD

(71) Applicant: Hitachi Astemo, Ltd., Hitachinaka (JP)

(72) Inventors: Daisuke Teshima, Hitachinaka (JP); Takashi Nomura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 347 days.

(21) Appl. No.: 18/568,370

(22) PCT Filed: May 18, 2022

(86) PCT No.: PCT/JP2022/020722
§ 371 (c)(1),
(2) Date: Dec. 8, 2023

(87) PCT Pub. No.: WO2022/259832
PCT Pub. Date: Dec. 15, 2022

(65) Prior Publication Data

US 2024/0283754 A1 Aug. 22, 2024

(30) Foreign Application Priority Data

Jun. 11, 2021 (JP) ................................ 2021-097917

(51) Int. Cl.
*H04L 49/90* (2022.01)
*H04L 12/40* (2006.01)

(52) U.S. Cl.
CPC ........ *H04L 49/90* (2013.01); *H04L 12/40006* (2013.01); *H04L 2012/40215* (2013.01)

(58) Field of Classification Search
CPC ............... H04L 49/90; H04L 12/40006; H04L 2012/40215
See application file for complete search history.

(56) References Cited

U.S. PATENT DOCUMENTS

2014/0379954 A1* 12/2014 Hayashi ............ H04L 12/40182 710/310
2015/0055473 A1* 2/2015 Moriya ............. H04L 12/40006 370/235

(Continued)

FOREIGN PATENT DOCUMENTS

JP 2006-238350 A 9/2006
JP 2012-142646 A 7/2012
JP 2014-11621 A 1/2014

OTHER PUBLICATIONS

International Preliminary Report on Patentability (PCT/IB/326, PCT/IB/338 & PCT/IB/373) issued in PCT Application No. PCT/JP2022/020722 dated Dec. 21, 2023, including Japanese-language Written Opinion (PCT/ISA/237) with English translation (11 pages).

(Continued)

*Primary Examiner* — Abdelnabi O Musa
(74) *Attorney, Agent, or Firm* — Crowell & Moring LLP

(57) ABSTRACT

A communication device 120 includes at least one transmission buffer Tx1 and at least one of reception buffers Rx1 to RxN. The communication device 120 transmits data provided with identification information from the transmission buffer T1x to a CAN bus 200 via a CAN transceiver 160, receives the data flowing through the CAN bus 200, and stores the received data in any one of the reception buffers Rx1 to RxN. With respect to the data stored in the reception buffers Rx1 to RxN, the communication device 120 recognizes, and processes accordingly, the data transmitted from the node of the communication device.

15 Claims, 9 Drawing Sheets

(56) References Cited

U.S. PATENT DOCUMENTS

| | | | | |
|---|---|---|---|---|
| 2017/0093659 | A1* | 3/2017 | Elend | H04L 63/1416 |
| 2019/0082016 | A1* | 3/2019 | Sasaki | H04L 41/0806 |
| 2019/0238586 | A1* | 8/2019 | Hong | H04L 12/40 |
| 2020/0120117 | A1* | 4/2020 | Hong | H04L 63/0263 |

OTHER PUBLICATIONS

International Search Report (PCT/ISA/210) issued in PCT Application No. PCT/JP2022/020722 dated Aug. 9, 2022 with English translation (4 pages).

Japanese-language Written Opinion (PCT/ISA/237) issued in PCT Application No. PCT/JP2022/020722 dated Aug. 9, 2022 with English translation (7 pages).

* cited by examiner

FIG. 5

RTBL

| CHANNEL NO. | RECEPTION ID | STORAGE DESTINATION |
|---|---|---|
| 0 | 0x100 | Buffer A |
| 1 | 0x111 | Buffer B |
| ⋮ | ⋮ | ⋮ |
| 127 | mask | FIFO |

FIG. 6

CTBL

| TRANSMISSION ID | RECEPTION ID | TRANSMITTING NODE |
|---|---|---|
| 0x100 | 0x100 | ANOTHER NODE |
| 0x105 | 0x105 | NODE |
| 0x111 | 0x110 | ANOTHER NODE |
| ⋮ | ⋮ | ⋮ |
| 0xXXX | 0xYYY | ANOTHER NODE |

FIG. 11

RTBL

| CHANNEL NO. | RECEPTION ID | STORAGE DESTINATION |
| --- | --- | --- |
| 0 | 0x100 | Buffer A |
| 1 | 0x111 | Buffer B |
| . . . | . . . | . . . |
| 125 | mask 1 | FIFO A |
| 126 | mask 2 | FIFO B |
| 127 | mask 3 | FIFO C |

| RECEPTION ID | RECEPTION CYCLE |
| --- | --- |
| 0x100 | 10ms |
| 0x101 | 10ms |
| . . . | . . . |

| RECEPTION ID | FUNCTION |
| --- | --- |
| 0x200 | Security |
| 0x201 | Security |
| . . . | . . . |

BUS COMMUNICATION DEVICE AND DATA COMMUNICATION METHOD

TECHNICAL FIELD

The present invention relates to a communication device and to a data communication method for transmitting and receiving data among electronic control units mounted on a vehicle.

BACKGROUND ART

Data transmitted and received among electronic control units is provided with identification information for identifying, for example, data contents and transmitting nodes. Due to improved functionality, etc., of on-board systems, identification information attached to data transmitted and received among electronic control units is increasing. In addition, there is a restriction that the totality of identification information that each channel forming a node can receive is limited in a communication device built into the electronic control unit. Thus, as described in Patent Document 1, a technique for integrally using multiple channels provided in a communications interface to receive data including a number of pieces of identification information that cannot be received on a single channel has been proposed.

REFERENCE DOCUMENT LIST

Patent Document

Patent Document 1: JP 2012-142646 A

SUMMARY OF THE INVENTION

Problem to be Solved by the Invention

Data transmitted from one channel of the communications interface flows through a communication bus forming an in-vehicle network and is communicated to all channels connected to the communication bus. For example, for mirroring, a communication device needs to receive and process data from the communication bus, as it is transmitted to the communication bus by the communication device. However, there are cases in which the communication device receives data provided with the same identification information as that of the data transmitted to the communication bus, from other communication devices. Whether the data is one that has been transmitted to the communication bus or one that has been transmitted from other communication devices cannot be distinguished, thereby making it difficult to process the data appropriately.

An object of the present invention is thus to provide a communication device and a data communication method that, with respect to data provided with the same identification information, can identify whether the data has been transmitted from the node of the communication device or has been transmitted from the node of another communication device.

Means for Solving the Problem

A communication device includes at least one transmission buffer and at least one reception buffer. The communication device transmits data provided with identification information from the transmission buffer to a communication bus, receives the data flowing through the communication bus, and stores the data in the reception buffer. With respect to the data stored in the reception buffer, the communication device recognizes, and processes accordingly, the data transmitted from its own node.

Effects of the Invention

According to the present invention, the communication device can identify whether data provided with the same identification information has been transmitted from its own node or has been transmitted from the node of another device.

BRIEF DESCRIPTION OF THE DRAWINGS

FIG. 5 is a diagram illustrating an example of a reception rule table.

FIG. 6 is a diagram illustrating an example of a configuration table.

FIG. 11 is a schematic view of another example of a reception rule table.

MODE FOR CARRYING OUT THE INVENTION

Hereinafter, an embodiment for implementing the present invention will be described in detail with reference to the accompanying drawings.

Figure 1:
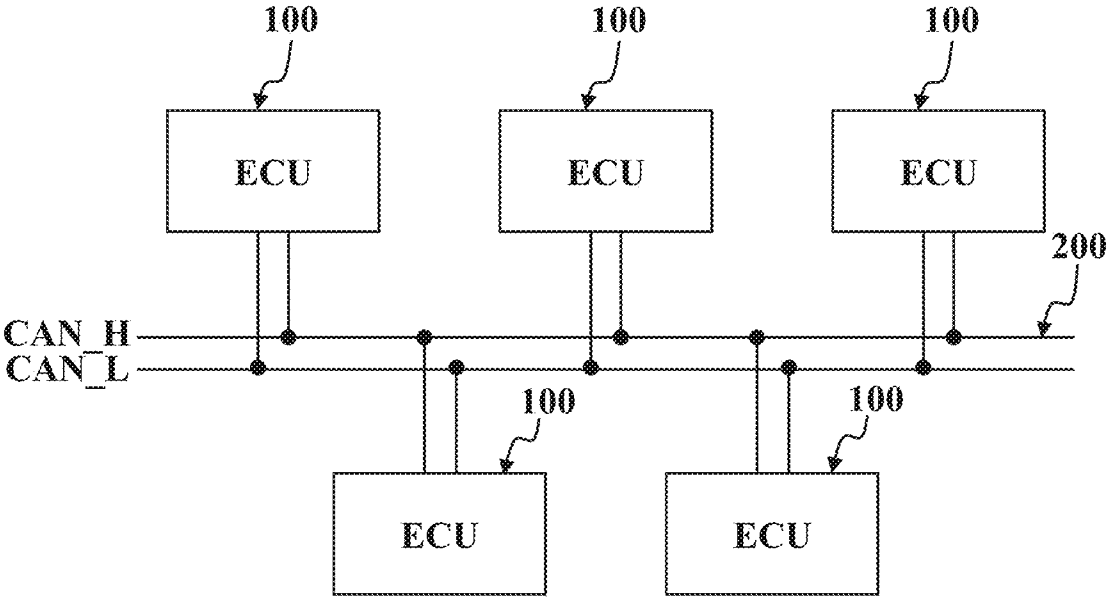
FIG. 1 is a schematic view of an example of an in-vehicle network.

FIG. 1 shows an example of a line-type in-vehicle network mounted on a vehicle, such as a car, a bus, a truck, or a construction machine. Multiple electronic control units (ECUs) 100 which electronically control systems such as an engine system, an automatic transmission system, an anti-skid system, and an automatic driving system, are connected via, for example, a controller area network (CAN) bus 200 so as to be able to mutually transmit and receive data. CAN bus 200 determines dominant and recessive states based on the voltage difference between two communication lines CAN_H and CAN_L to be less affected by noise.

Here, CAN bus 200 is an example of a communication bus. However, the communication bus is not limited to CAN bus 200, and may also be any well-known bus such as Local Interconnect Network (LIN) bus and FlexRay® bus. In the example of the in-vehicle network shown in FIG. 1, the vehicle is equipped with five electronic control units 100; however, the number of electronic control units 100 may be set as desired.

As an example of data provided with identification information, a data frame DF or a remote frame RF used in a CAN protocol is transmitted and received among multiple electronic control units 100.

Figure 2:
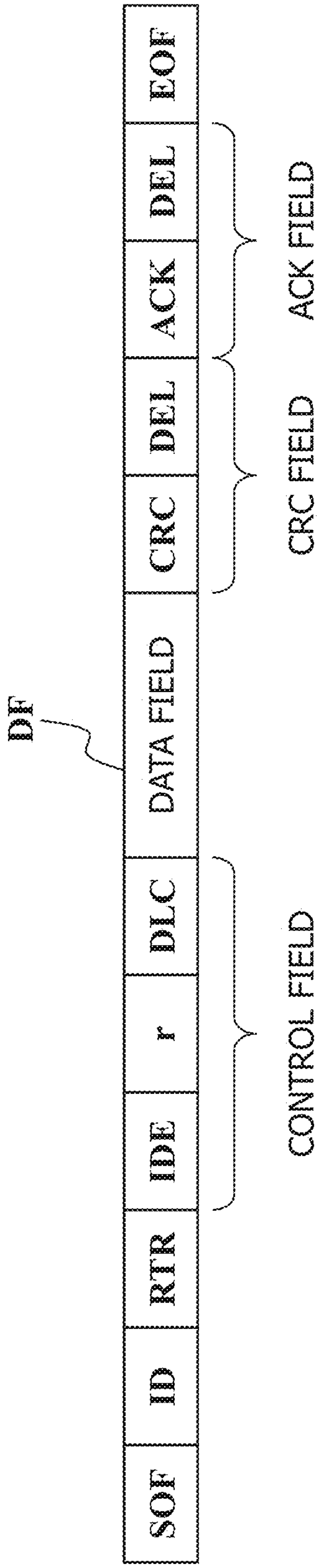
FIG. 2 is a diagram illustrating an example of a data frame.

As shown in FIG. 2, data frame DF includes Start Of Frame (SOF), Identifier (ID), Remote Transmission Request (RTR), a control field, a data field, a Cyclic Redundancy Check (CRC) field, and an Acknowledgement (ACK) field, and End Of Frame (EOF). ID is an example of identification information attached to data.

SOF indicates the start of data frame DF. ID is used to identify data contents and transmitting nodes and to indicate a priority of communication arbitration. RTR is used to distinguish data frame DF and remote frame RF. The control field includes Identifier Extension (IDE), reserved bit r, and Data Length Code (DLC) that indicates how many bytes of data are transmitted in the data field. The data field is used to store the body of data transmitted. CRC field includes a CRC sequence to determine whether the data was successfully received and a CRC delimiter that indicates the end of the CRC sequence. ACK field includes an ACK slot and an ACK delimiter that indicates the end of the ACK slot. EOF field indicates the end of data frame DF. Data frame DF shown in FIG. 2 is an example of a data frame in a standard format, but it may also be in an extended format.

Figure 3:
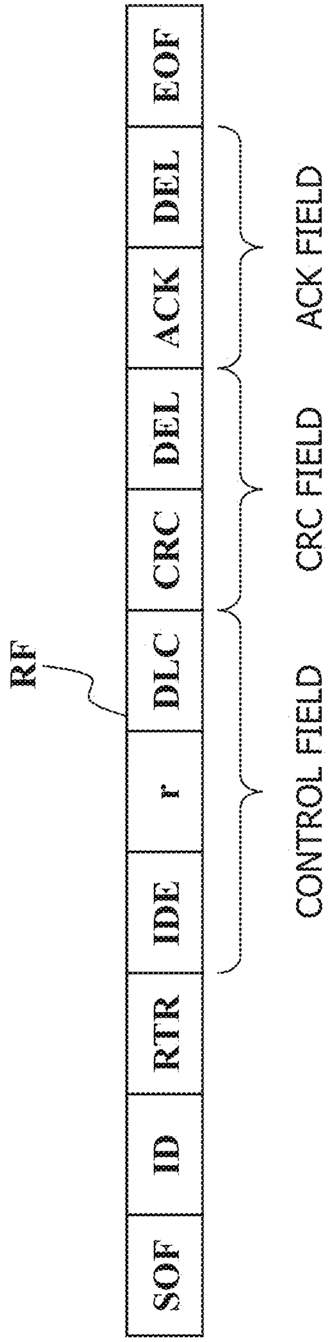
FIG. 3 is a diagram illustrating an example of a remote frame.

Remote frame RF is used to request data frame DF and includes SOF, ID, RTR, a control field, a CRC field, an ACK field, and EOF, as shown in FIG. 3. That is, remote frame RF has a basic structure obtained by removing the data field from data frame DF. Thus, remote frame RF will not be explained in detail in order to avoid duplicate explanation. See the description of data frame DF, if necessary.

Figure 4:
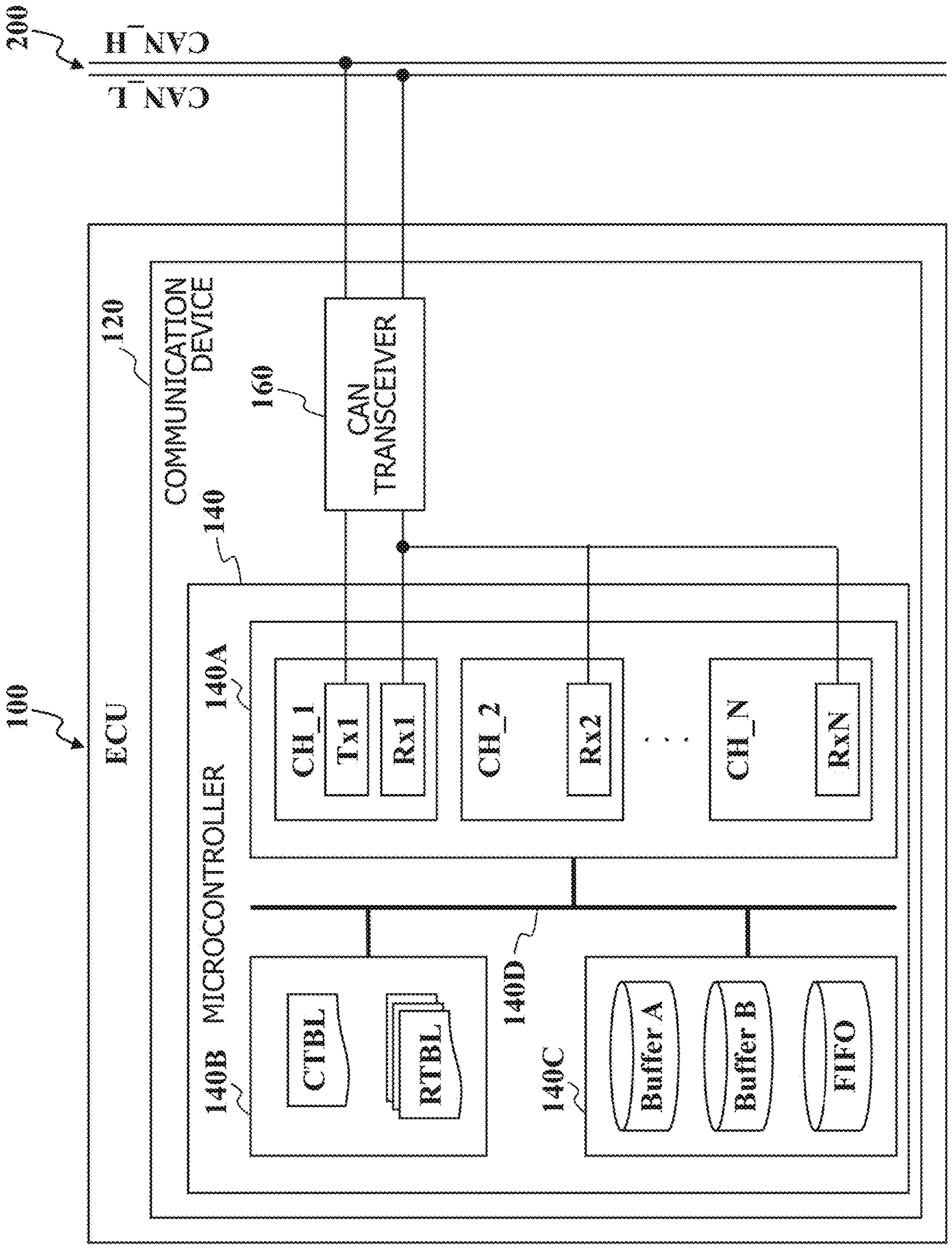
FIG. 4 is a schematic view of an example of a communication device built into an electronic control unit.

As shown in FIG. 4, electronic control unit 100 incorporates, in addition to a microcomputer (not shown) for controlling a control target device, at least a communication device 120 that is in connection with CAN bus 200 to transmit and receive data. Communication device 120 includes a microcontroller 140 for transmitting and receiving data and a CAN transceiver 160.

Microcontroller 140 includes a buffer module 140A, a non-volatile memory 140B, a volatile memory 140C, and an internal bus 140D for connecting them in a mutually communicable manner.

The communications interface of buffer module 140A has a plurality of channels CH_1 to CH_N (N:two or more natural numbers) that function as a node. Here, the number of channels incorporated in buffer module 140A can be set appropriately, taking into consideration, for example, devices to be controlled by electronic control unit 100 and the number of electronic control units 100 mounted on the vehicle.

Channel CH_1 has at least one transmission buffer Tx and at least one reception buffer Rx. In addition, channels CH_2 to CH_N each have at least one reception buffer Rx. In the example shown in FIG. 4, one reception buffer Rx is provided for each channel CH_1 to CH_N. Here, it should be understood that reception buffer Rx is a collective representation that may include multiple reception buffers. In the following description, the reception buffer of channel CH_i (i: a natural number from 1 to N) will be represented as "Rxi", as necessary. When reception buffer Rxi contains multiple reception buffers, each reception buffer shall be represented as "Rxn(j)" (j: the number of reception buffers contained in reception buffer Rxn), as necessary.

In channel CH_i, an ID attached to data to be received by each reception buffer Rxi j) is predefined according to a reception rule table RTBL (details of which will be described below) that is associated with channel CH_i in a one-to-one manner. That is, reception buffers Rxi (j) are each allocated to respective ID of data. Here, at least some of reception buffers Rxi (j) of channel CH_i may be configured to receive multiple data with different IDs exceeding the number of reception buffers Rxi ( ) by a mask process using a wildcard.

Nonvolatile memory 140B includes, for example, flash Read Only Memory (ROM) or Electrically Erasable Programmable Read Only Memory (EEPROM) that can retain data even when the power supply is cut off, and stores one configuration table CTBL and a plurality of reception rule tables RTBLs. Here, configuration table CTBL and each reception rule table RTBL stored in nonvolatile memory 140B are respectively examples of a second table and a first table.

Volatile memory 140C includes, for example, Dynamic Random Access Memory (DRAM) or Static Random Access Memory (SRAM) that loses data when the power supply is cut off, and stores buffers A and B and a First In, First Out (FIFO) buffer which transfer and temporarily store the data stored in reception buffers Rxi of buffer module 140A. Here, the number of the buffers and FIFO buffers stored in volatile memory 140C can be changed appropriately according, for example, to the control content of the control target device.

CAN transceiver 160, which is a bus interface Integrated Circuit (IC) used to connect microcontroller 140 to other microcontrollers, for example, generates and adjusts bus transmission voltage, ensures an operating current, and protects a wiring. A data input port of CAN transceiver 160 is connected to transmission buffer Tx1 of channel CH_1 in buffer module 140A. A data output port of CAN transceiver 160 is connected to all reception buffers Rx1 to RxN of channels CH_1 to CH_N in buffer module 140A. Two ports for serial communication of CAN transceiver 160 are respectively connected to communication lines CAN_H and CAN_L of CAN bus 200.

Accordingly, by integrally using reception buffers Rx1 to RxN of multiple channels CH_1 to CH_N, buffer module 140A can receive data including a number of IDs that cannot be received on a single channel CH_i. For example, if one channel CH_i can receive data including 128 IDs, data with 128×N different IDs can be received by integrally using N channels.

Reception rule tables RTBLs stored in non-volatile memory 140B are each provided for corresponding channel CH_i of buffer module 140A. In each reception rule table RTBL, as shown in FIG. 5, at least one record, with which a channel number capable of specifying the reception buffer Rxi (j) at which data is received, the ID of the received data (reception ID), and the storage destination are associated, is defined.

The reception rule table RTBL shown in FIG. 5 is based on the premise that there are 128 reception buffers Rx in each channel CH_i. Reception buffer Rxi (0), to which channel number "0" is attached, is defined to receive data provided with reception ID "0x100" and to store the data in buffer A of volatile memory 140C. Reception buffer Rxi (1), to which channel number "1" is attached, is defined to receive data provided with reception ID "0x111" and to store the data in buffer B of volatile memory 140C. Furthermore, reception buffer Rxi (127), to which channel number "127" is attached, is defined to receive multiple data provided with different IDs by a mask process using a wildcard and to store the data in a FIFO buffer made up of multiple buffers in a first-in, first-out format.

Configuration table CTBL stored in non-volatile memory 140B is used to enable data provided with the same ID as that of the transmitted data to be recognized, for mirroring or other purposes. In configuration table CTBL, as shown in FIG. 6, at least one record is specified as being associated with an ID of transmitted data (transmission ID), an ID of received data (reception ID), and a transmitting node capable of identifying whether the received data that has been transmitted from the node of the communication device or has been transmitted from the node of another communication device. That is, each record in configuration table CTBL is associated at least with the ID of the transmitted data and the ID of the received data. Optionally, in addition to the ID of the transmitted data and the ID of the received data, each record of configuration table CTBL is associated with a transmitting node capable of identifying whether the received data has been transmitted from the node of the communication device or has been transmitted from the node of another communication device.

In the first record of configuration table CTBL shown in FIG. 6, it is defined that the transmission ID is "0x100", the reception ID is "0x100", and the transmitting node is "another node", i.e., that the data provided with reception ID "0x100" has been transmitted from the node of another device. In the next record of configuration table CTBL, it is defined that the transmission ID is "0x105", the reception ID is "0x105", and the transmitting node is "the node", i.e., that the data provided with reception ID "0x105" has been transmitted from the node of the communication device.

Communication device 120 of electronic control unit 100 sets reception rule table RTBL by referring to configuration table CTBL at the time of initialization when communication device 120 is started up.

Figure 7:
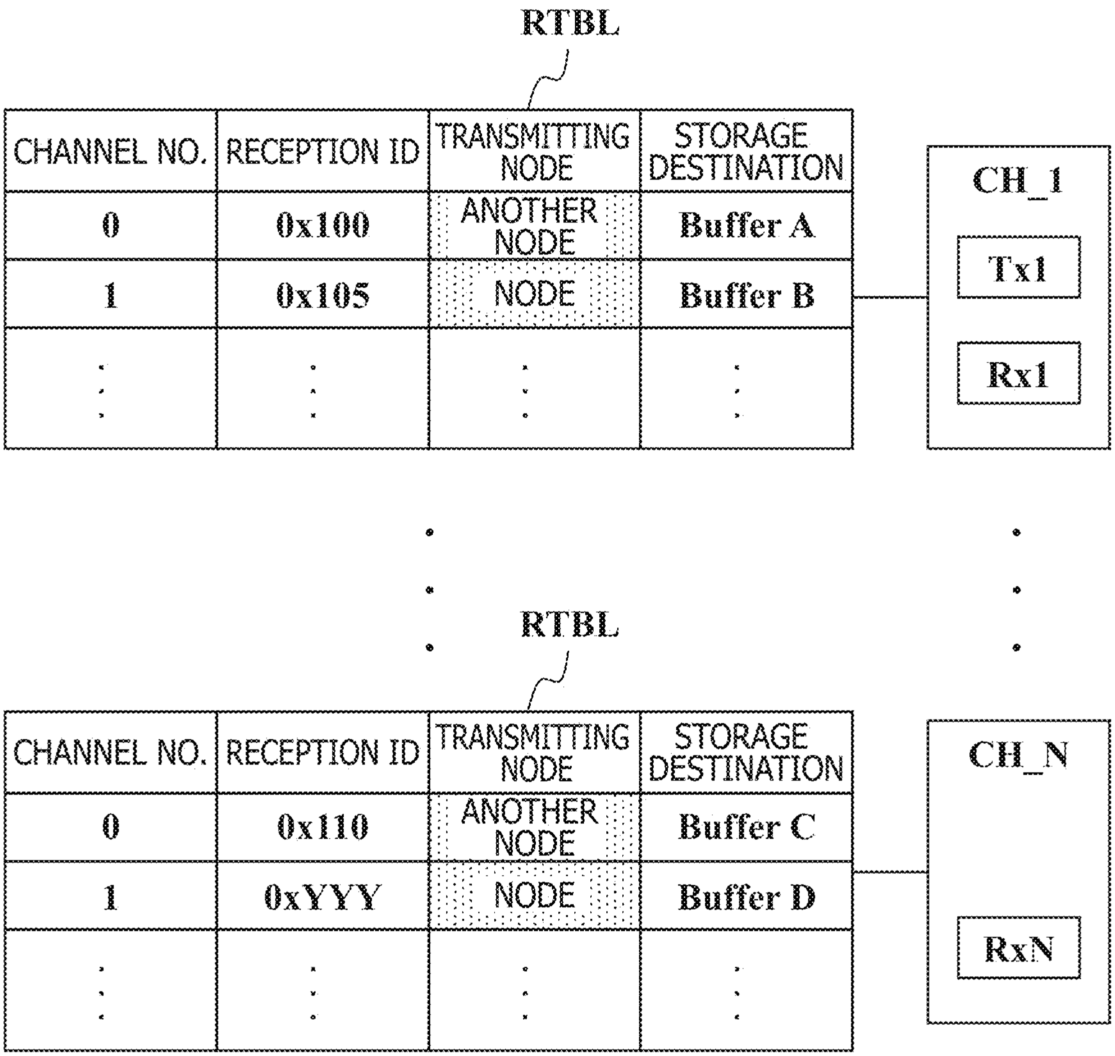
FIG. 7 is a diagram illustrating examples of reception rule tables set using a configuration table.

How communication device 120 sets reception rule table RTBL using configuration table CTBL shown in FIG. 6 will be described. Communication device 120 refers to configuration table CTBL, scans it sequentially from the first record to the last record, and extracts records each having the same transmission ID and reception ID, for example, the first record and the next record. Then, as shown in FIG. 7, with respect to the multiple reception rule tables RTBLs each corresponding to the respective channels CH_1 to CH_N in a one-to-one manner, communication device 120 sets as the transmitting node either "the node" or "another node" for each record with the reception ID included in the extracted record. That is, in each record of the reception rule tables RTBLs, at least the ID of the data received from CAN bus 200 and the transmitting node capable of identifying whether the received data has been transmitted from the node of the communication device or has been transmitted from the node of another communication device, are associated. Because setting of the reception rule tables RTBLs is performed by hardware, such as an electronic circuitry that constitutes buffer module 140A of communication device 120, an increase in the processing load on the microcomputer of electronic control unit 100 can be suppressed.

In such a communication device 120, when, for example, transmitting data provided with ID "0x100" from electronic control unit 100 to CAN bus 200, a microcomputer, which is not shown in the drawings, stores the data in transmission buffer Tx1 of channel CH_1 of buffer module 140A. Once the data is stored in transmission buffer Tx1, buffer module 140A sends the data in transmission buffer Tx1 out to the data input port of CAN transceiver 160 and clears transmission buffer Tx1 through a hardware process. After receiving the data, CAN transceiver 160 sends the data received from microcontroller 140 out to CAN bus 200 through the two ports for serial communication while converting the data into a protocol compatible with CAN bus 200.

The data sent out to CAN bus 200 flows through CAN bus 200 and is communicated to communication devices 120 of all electronic control units 100 connected to CAN bus 200. Specifically, CAN transceiver 160 connected to CAN bus 200 sends out, from the data output port, the data received from CAN bus 200 to all reception buffers Rx1 to RxN of channels CH_1 to CH_N while converting the data to a protocol compatible with microcontroller 140.

Buffer module 140A refers to the multiple reception rule tables RTBLs stored in non-volatile memory 140B and stores data into the corresponding reception buffer Rx according to the reception rules defined therein. This process will be described using a specific example. When the ID of the received data is "0x100", referring to reception rule tables RTBLs shown in FIG. 7, buffer module 140A stores the data in reception buffer Rx of channel CH_1 that corresponds to channel number 0 associated with the reception ID "0x100". After storing the data in reception buffer Rx, buffer module 140A stores data in buffer A, the storage destination associated with reception ID "0x100", referring to the reception rule tables RTBLs shown in FIG. 7, and clears the reception buffer Rx.

At this time, buffer module 140A can identify whether the received has been transmitted from the node of the communication device or has been transmitted from the node of another communication device by referring to the reception ID and the transmitting node in the reception rule tables RTBLs shown in FIG. 7. That is, buffer module 140A extracts the ID from the received data and determines whether or not this ID is present in the reception rule tables RTBLs. If buffer module 140A determines that the ID of the received data is present in the reception rule tables RTBLs, it refers to the transmitting node in the record associated with this ID, and if the transmitting node is "the node", it identifies the received data as having been transmitted from the node of the communication device itself. On the other hand, if the transmitting node of the record associated with the ID of the received data is "another node", buffer module 140A identifies the received data as having been transmitted from the node of another communication device.

Identification process will be described using the reception rule tables RTBLs shown in FIG. 7 as an example. When the ID of the received data is "0x00", referring to reception rule tables RTBLs, buffer module 140A specifies a record with reception ID "0x100". Then, referring to the transmitting node of that record and finding that the transmitting node is "another node", buffer module 140A identifies that the received data as having been transmitted from the node of another communication device. When the ID of the received data is "0x105", referring to the reception rule tables RTBLs, buffer module 140A specifies a record with reception ID "0x105". Then, referring to the transmitting node of that record and finding that the transmitting node is "the node", buffer module 140A identifies that the received data as having been transmitted from the node of the communication device, i.e., one for mirroring.

Therefore, when having received data provided with the same ID as that of the transmitted data, communication device 120 can identify whether the received data has been transmitted from the node of the communication device or has been transmitted from the node of another communication device by referring to reception rule tables RTBLs. Communication device 120 can thus process the received data appropriately according to the identification result.

Figure 8:
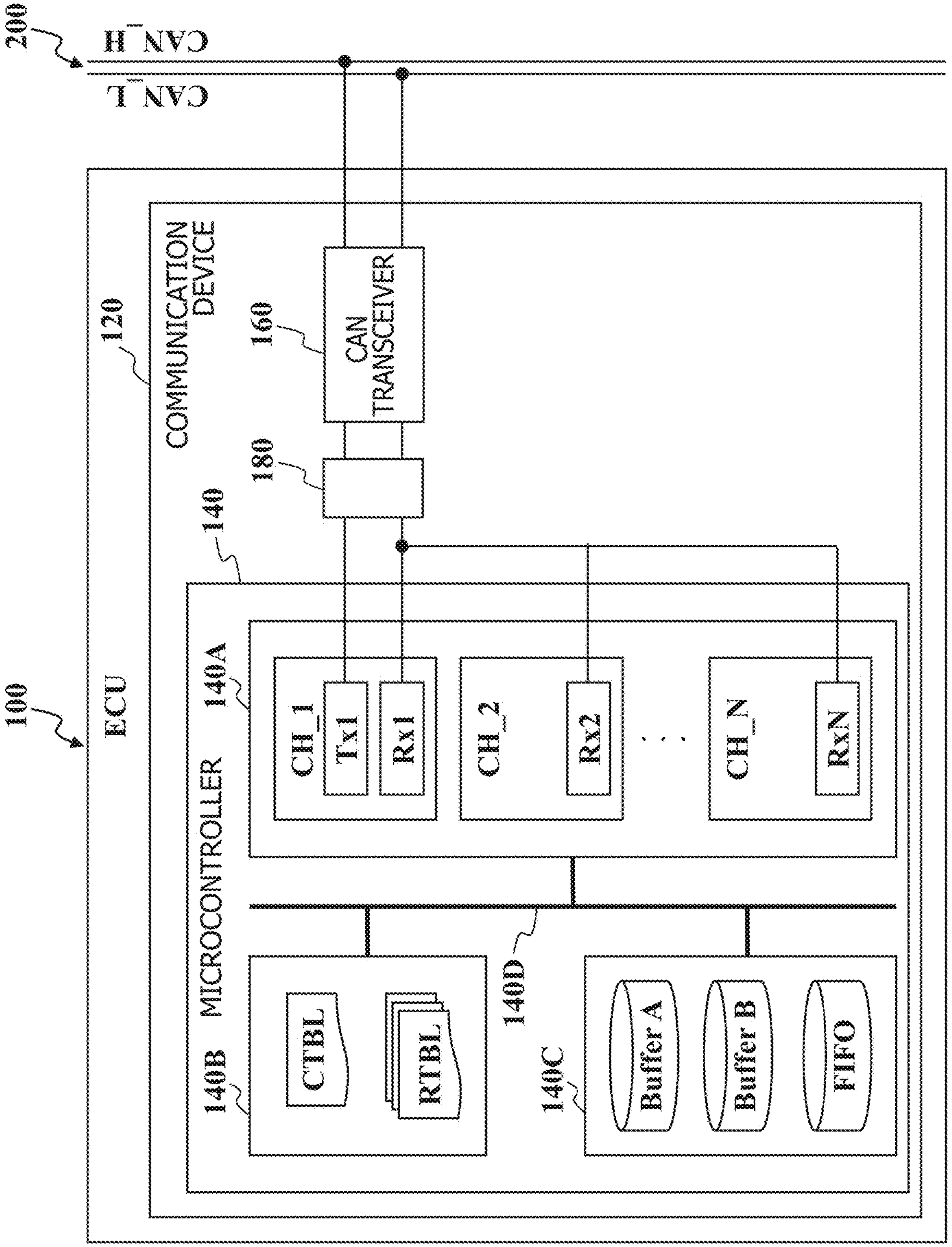
FIG. 8 is a schematic view of another example of a communication device built into an electronic control unit.

When no mirroring is required in electronic control unit 100, even if communication device 120 receives data provided with the same ID as that of the data transmitted therefrom, the received data is not used for controlling the control target device, and accordingly, the resources may not be utilized effectively. Therefore, as shown in FIG. 8, a data discard circuit 180 that discards data from CAN transceiver 160 during data transmission may be disposed on the two lines connecting buffer module 140A of microcontroller 140 and CAN transceiver 160. That is, data discard circuit 180 may be disposed between transmission buffer Tx1 and reception buffers Rx1 to RxN, and CAN bus 200. Desirably, data discard circuit 180 is, for example, a dedicated IC to reduce the processing load on the microcomputer of electronic control unit 100.

Figure 9:
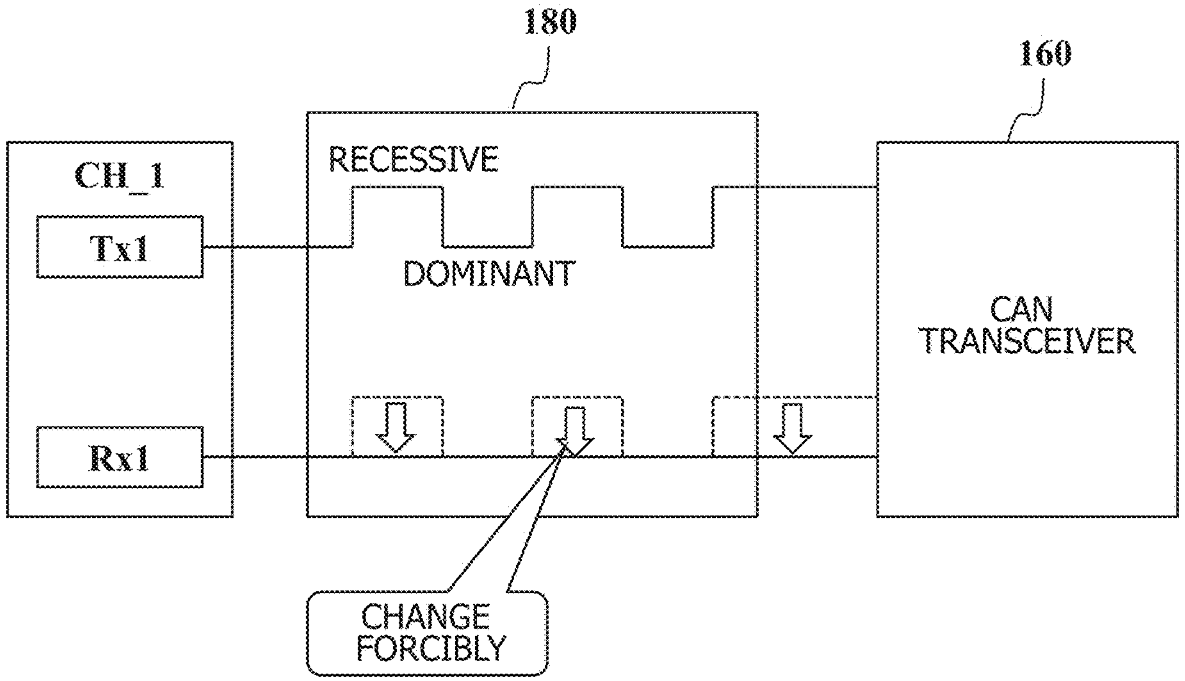
FIG. 9 is a diagram illustrating a data blocking function at the time when the data blocking circuit is in operation.
Figure 10:
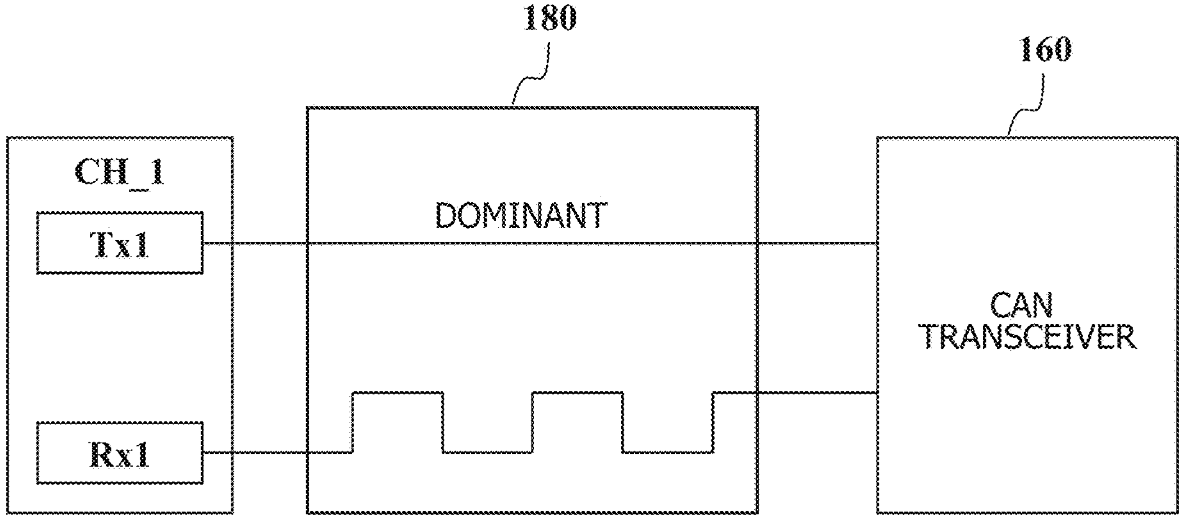
FIG. 10 is a diagram illustrating the data blocking function at the time when the data blocking circuit is not in operation.

As shown in FIG. 9, data discard circuit 180 discards data, which is to be transmitted from CAN transceiver 160 to buffer module 140A, while data is being transmitted from transmission buffer Tx1 of channel CH_1 of buffer module 140A to CAN transceiver 160. Specifically, when the data is recessive, data discard circuit 180 determines that data is being transmitted to CAN transceiver 160, and forcibly changes the data transmitted from the CAN transceiver 160 from recessive to dominant (see dashed line in the figure). Data discard circuit 180 prevents meaningful data from being transmitted to buffer module 140A and thereby substantially discards the data.

By adding data discard circuit 180, the data, which is to be transmitted from CAN transceiver 160 to reception buffers Rx1 to RxN of channels CH_1 to CH_N, is discarded while data is being transmitted from transmission buffer Tx1 of channel CH_1 in buffer module 140A. Thus, when no mirroring is required, communication device 120 does not receive data for mirroring that is not subject to the processing, and thereby reception buffers Rx1 to RxN of buffer module 140A can be used effectively. In order to switch data discard circuit 180 to be effective or ineffective, a switching function such as a mechanical or software switch, for example, may be provided.

When multiple data have been stored in the FIFO buffer by a mask process and certain data is to be used, the microcomputer of electronic control unit 100 needs to scan the FIFO buffer and select data by an application program. In addition, the microcomputer of electronic control unit 100 needs to scan data at a certain period to avoid the FIFO buffer becoming full and being unable to store data. Thus, the processing load required for scanning the FIFO buffer is further applied to the microcomputer of electronic control unit 100. Buffer unit 120A of communication device 120 may transfer the data stored in reception buffer Rx to a virtual storage using Direct Memory Access (DMA); however, the same problem as with the FIFO buffer occurs.

Therefore, as shown in FIG. 11, data may be grouped in reception rule table RTBL according to a predetermined rule, such as data reception cycle or function, so that data may be stored in different FIFO buffers for each group. In one example shown in FIG. 11, as for mask 1 of channel number "125", it is defined that data with reception cycle of 10 ms is to be stored in FIFO buffer A, and as for mask 2 of channel number "126", it is defined that data for the function of "security" is to be stored in FIFO buffer B. That is, communication device 120 can set multiple mask processes for respective groups having IDs classified according to predetermined rules. As for mask 3 of channel number "127", it is indicated that the reception ID and storage destination are defined according to a predetermined rule.

This makes it possible to optimize the data scanning frequency and scanning target by, for example, shortening the FIFO buffer scanning cycle for data with a short reception cycle and lengthening the FIFO buffer scanning cycle for data with a long reception cycle. In addition, as for data used for a specific function, scanning of irrelevant data not used for that function can be avoided by scanning the FIFO buffer at a cycle set in consideration of the function of the data, etc. The scanning frequency and scanning target can thereby be optimized. Optimizing the data scanning frequency and scanning target can make it possible to avoid the FIFO buffer becoming full and unable to store data and to reduce the processing load on the microcomputer of electronic control unit 100.

Therefore, according to communication device 120 of the present embodiment, microcontroller 140 itself does not necessarily have to be one having high functionality and surplus resources, but resources of microcontroller 140 can be utilized to increase the number of IDs that can be received.

One skilled in the art would readily understand that a new embodiment can be made by omitting, appropriately combining, or replacing a part of a variety of technical ideas of the above embodiment.

As an example, not only buffer module 140A, but each channel CH_1 to CH_N having received data may store the received data into the buffers or the FIFO buffer.

In addition, buffer module 140A may refer to configuration table CTBL shown in FIG. 6, instead of reception rule tables RTBLs shown in FIG. 7, to identify whether the received data has been transmitted from the node of the communication device or has been transmitted from the node of another communication device. In this case, instead of reception rule tables shown in FIG. 7, the original reception rule table shown in FIG. 5 may be used as the reception rule table RTBL.

Furthermore, reception rule tables RTBLs shown in FIG. 7 may be generated in advance, for example, by a designer, without using configuration table CTBL. In this case, communication device 120 is obviously not required to have configuration table CTBL.

REFERENCE SYMBOL LIST

120 Communication device
140A Buffer module
200 CAN bus (communication bus)
ID Identification information
CAN_H Communication line
CAN_L Communication line
CH_1 to CH_N Channels
Tx1 Transmission buffer
Rx1 to RxN Reception buffers
DF Data frame (data)
RF Remote frame (data)

The invention claimed is:

1. A communication device comprising at least one transmission buffer and at least one reception buffer, the communication device configured to transmit data provided with identification information from the transmission buffer to a communication bus, receive data flowing through the communication bus, and store the data in the reception buffer, wherein with respect to the data stored in the reception buffer, the communication device recognizes, and processes accordingly, data transmitted from the communication device itself, and the identification information of transmitted data does not differ from identification information of data received from another communication device via the communication bus.

2. The communication device according to claim 1, wherein a plurality of the reception buffers is present, and wherein each of the plurality of the reception buffers is allocated to respective identification information.

3. The communication device according to claim 2, wherein the reception buffers can be allocated to a plurality of pieces of identification information using a wildcard.

4. The communication device according to claim 3, wherein a plurality of the wildcards can be set for respective identification information classified according to a predetermined rule.

5. The communication device according to claim 1, comprising a first table storing at least one record associated with identification information of received data received from the communication bus and a transmitting node capable of identifying whether the received data has been transmitted from the node of the communication device or has been transmitted from the node of another communication device, wherein the communication device identifies, using the first table, whether the data has been transmitted from the node of the communication device.

6. The communication device according to claim 1, comprising a second table storing at least one record associated with identification information of transmitted data transmitted from the transmission buffer and identification information of received data received from the communication bus, wherein the communication device identifies, using the second table, whether the data has been transmitted from the node of the communication device.

7. The communication device according to claim 6, wherein the second table stores, in addition to the identification information of the transmitted data and the identification information of the received data, a record associated with a transmitting node capable of identifying whether the received data has been transmitted from the node of the communication device or has been transmitted from the node of another communication device.

8. The communication device according to claim 1, further comprising a data discard circuit that is disposed between the transmission buffer and the reception buffer, and the communication bus, and discards data to be transmitted from the communication bus to the reception buffer while data is being transmitted from the transmission buffer to the communication bus.

9. The communication device according to claim 8, further comprising a switching function for switching the data discard circuit between an effective state and an inefective state.

10. A data communication method comprising, by a communication device that includes at least one transmission buffer and at least one reception buffer and is configured to transmit data provided with identification information from the transmission buffer to a communication bus, receive data flowing through the communication bus, and store the data in the reception buffer:

transmitting the data provided with the identification information from the transmission buffer to the communication bus;

receiving the data flowing through the communication bus;

storing the data in the reception buffer; and with respect to the data stored in the reception buffer, recognizing, and processing accordingly, data transmitted from the communication device itself, wherein the identification information of transmitted data does not differ from identification information of data received from another communication device via the communication bus.

11. The data communication method according to claim 10, further comprising:

providing a plurality of the reception buffers; and allocating each of the plurality of the reception buffers to respective identification information.

12. The data communication method according to claim 11, further comprising allocating the reception buffers to a plurality of pieces of identification information using a wildcard.

13. The data communication method according to claim 12, further comprising: setting a plurality of the wildcards for respective identification information classified according to a predetermined rule.

14. The data communication method according to claim 10, further comprising:

providing a first table storing at least one record associated with identification information of received data received from the communication bus and a transmitting node capable of identifying whether the received data has been transmitted from the node of the communication device or has been transmitted from the node of another communication device; and identiying, using the first table, whether the data has been transmitted from the node of the communication device.

15. The data communication method according to claim 10, further comprising:

providing a second table storing at least one record associated with identification information of transmitted data transmitted from the transmission buffer and identification information of received data received from the communication bus; and identifying, using the second table, whether the data has been transmitted from the node of the communication device.

* * * * *